United States Patent [19]

Athayde et al.

[11] Patent Number: 5,024,594

[45] Date of Patent: Jun. 18, 1991

[54] PROTECTIVE CLOTHING MATERIAL

[75] Inventors: Amulya L. Athayde, Mountain View; Richard W. Baker, Palo Alto, both of Calif.

[73] Assignee: Membrane Technology & Research, Inc., Menlo Park, Calif.

[21] Appl. No.: 438,527

[22] Filed: Nov. 17, 1989

Related U.S. Application Data

[63] Continuation-in-part of Ser. No. 890,378, Jul. 23, 1986.

[51] Int. Cl.[5] .................. B32B 7/00

[52] U.S. Cl. .................. 428/246; 427/340; 427/341; 427/342; 427/389.9; 427/412; 428/252; 428/253; 428/282; 428/284; 428/286; 428/315.5; 428/315.7; 428/315.9; 428/332; 428/421; 428/422; 428/447; 428/913

[58] Field of Search .................. 428/246, 252, 253, 282, 428/284, 286, 315.5, 315.7, 315.9, 332, 421, 422, 447, 913; 427/340, 341, 342, 389.9, 412

[56] References Cited

U.S. PATENT DOCUMENTS

| | | | |
|---|---|---|---|
| 3,769,144 | 10/1973 | Economy et al. | 161/50 |
| 4,201,822 | 5/1980 | Cowsar | 428/240 |
| 4,217,386 | 8/1980 | Arons et al. | 428/198 |
| 4,243,701 | 1/1981 | Riley et al. | 427/244 |
| 4,433,024 | 2/1984 | Eian | 428/198 |
| 4,460,641 | 7/1984 | Barer et al. | 428/246 |
| 4,469,744 | 9/1984 | Grot et al. | 428/246 |
| 4,513,047 | 4/1985 | Leach et al. | 428/175 |
| 4,515,761 | 5/1985 | Plotzker | 423/240 |
| 4,518,650 | 5/1985 | Grot et al. | 428/286 |
| 4,565,727 | 1/1986 | Giglia et al. | 428/172 |
| 4,872,220 | 10/1989 | Haruvy et al. | 2/243 |

FOREIGN PATENT DOCUMENTS

| | | |
|---|---|---|
| 58155917 | 3/1957 | Japan . |
| 59-12840 | 6/1984 | Japan . |

OTHER PUBLICATIONS

H. Strathmann et al., "The Formation of Asymmetric Membranes", Desalination, 16, 175 (1975).

R. W. Baker and H. K. Lonsdale, "Controlled Release Mechanisms and Rates", in Controlled Release of Biologically Active Agent, A. C. Tanquery and R. E. Lacey (Eds.) Plenum Press, New York (1974).

R. W. Baker and T. Blume, "Permselective Membranes Separate Gases", Chemtech, 16 232-239 (1986).

R. M. Barrer and G. Skirrow, "Transport and Equilibrium Phenomena in Gas Elastomer Systems, I. Kinetic Phenomena", J. Poly. Sci., 3, 549 (1948).

*Primary Examiner*—James J. Bell

*Attorney, Agent, or Firm*—J. Farrant

[57] ABSTRACT

A protective material having a membrane layer and a sorbent layer. The membrane is a thin-film composite membrane permeable to water vapor but relatively impermeable to organic vapors. The sorbent layer includes activated carbon or other sorbent or reactive material, and captures traces of organic vapor that permeate the membrane layer. The material is particularly useful in intermediate-level protective clothing.

25 Claims, 6 Drawing Sheets

PROTECTIVE CLOTHING MATERIAL

This invention was made with Government support under Contract Number FO4701-86-C-0036, awarded by the Department of the Air Force, AFSC Space Division. The Government has certain rights in this invention.

This application is a continuation in part of U.S. patent application Ser. No. 890,378, filed July 23, 1986.

FIELD OF THE INVENTION

This invention relates to a multilayer material useful for protective clothing. The material incorporates a thin-film composite membrane layer and a sorbent layer. The invention further relates to garments made from this material, and its use in other protective applications.

BACKGROUND OF THE INVENTION

There are many situations in modern industrial settings where personnel need protection from toxic organic materials to which they may be exposed, either as an ongoing part of the work environment, or as a result of accident or emergency.

A range of protective garments is now available for use in such hazardous conditions, where the potential or actual release of organic vapors and liquids poses a threat to the health and safety of the workforce.

Gear currently used to safeguard workers in these surroundings consists of protective masks, hoods, clothing, gloves and footwear. This equipment, when made from rubber or plastic, can be essentially impervious to hazardous chemicals. Unfortunately, these materials are also impervious to air and water vapor, and thus retain body heat, exposing their wearer to heat stress which can build quite rapidly to a dangerous level.

Another approach to protective clothing, well known in the art, is the use of garments manufactured from a laminated fabric incorporating activated carbon, which has the ability to sorb toxic vapors and prevent penetration to the skin. Examples of this method include U.S. Pat. Nos. 3,769,144 to Economy et al., 4,217,386 to Arons et al., 4,433,024 to Eian, 4,513,047 to Leach et al. and 4,565,727 to Giglia et al. The main disadvantage of this approach is that the fabrics lose their sorptive properties with time. As active carbon sites become saturated, the garment becomes unreliable and presents a decontamination problem in addition. In some fabrics it has been shown that the absorption of perspiration from the user can reduce the amount of available carbon to such an extent that the garment becomes unsafe after a use period of only a few hours.

Chemical de-activation, using materials treated with reactive decontaminants such as chloroamide, is another possibility. However, chloroamide-treated fabrics deteriorate over time, necessitating regular inspection and possible re-impregnation. In addition, these fabricate liberate hypochlorite when exposed to perspiration or other moisture, and can cause unacceptable levels of skin irritation to the wearer.

The use of modern semipermeable membranes, as developed for use in the separation of gases or liquids, as a constituent of the protective material is a newer approach. U.S. Pat. No. 4,201,822 to Cowsar discloses a fabric containing known reactive chemical decontaminants, which are encapsulated in microparticles bonded to the fabric. The microparticle walls are permeable to toxic vapors, but impermeable to decontaminants, so that the toxic agents diffuse selectively into the particles, where they are rendered harmless. Encapsulating the active agent in this way avoids the liberation of hypochlorite, and subsequent skin irritation, that has been shown to be a problem with clothing treated with chloroamide. Employing a similar concept, U.S. Pat. No. 4,460,641, to Barer et al., discloses the use of microporous hollow fibers, whose lumina are filled with one or more chemical neutralizing agents, to form one layer of a protective fabric. Of course in both these cases, the decontaminant agent will still become exhausted with time.

The deployment of a synthetic polymeric membrane as a barrier to the permeation of organic vapors, rather than as a means of absorption, is disclosed for example in U.S. Pat. Nos. 4,469,744 and 4,518,650 to Grot et al., and 4,515,761 to Plotzker, all assigned to DuPont. In these patents, the ability of the composite fabric to reject toxic organic agents resides in a layer of semipermeable highly fluorinated ion exchange polymer, which is permeable to water vapor, but relatively impermeable to a broad range of organic vapors. In this way, the user can remain cool and comfortable, and enjoy some protection from harmful agents. The main disadvantage of these garments is in the measure of their impermeability. They are adequate for protection in many industrial applications, but their organic vapor transmission rates depend on the molecular weight of the substance involved, and may be far in excess of recommended safe exposure levels for potent toxic agents with low molecular weights.

U.S. patent application Ser. No. 890,378, commonly owned and copending with the present application, teaches a protective clothing material comprising a multilayer membrane having a microporous support layer and a thin, dense, permselective layer.

SUMMARY OF THE INVENTION

The invention is an improved material for protective clothing. The material incorporates a membrane layer and a sorbent layer. The membrane is a thin-film composite membrane, similar in concept to membranes that have been developed for industrial gas and liquid separations. The membrane has two layers: a microporous support layer, which provides mechanical strength but minimal barrier capabilities; and an ultrathin, dense coating, which is permeable to water vapor, but highly impermeable to organic vapors. The sorbent layer includes activated carbon or other sorbent or reactive material, and captures traces of organic vapor that permeate the membrane layer. The resulting material provides better performance than could be achieved with a membrane layer or a sorbent layer alone, particularly in providing protection against small molecules of toxic organic agents. The amount of sorbent needed is small compared with the amount used in conventional sorbent loaded fabrics, because only trace quantities of organic vapors will reach the sorbent layer. Consequently garments made from the material also have a longer useful life than those where the sorbent is heavily exposed to organic vapors. The relative thinness and lightness of the sorbent layer makes for greatly increased breathability and comfort compared with conventional protective clothing. Although many applications for the material can be recognized, it is believed that it will be particularly useful as intermediate level protective clothing. Such material is used in situations where ambient levels of toxic vapors are zero or close to zero, but where levels could rise to 500 ppm or more in the case of an accident or emergency.

A representative way to make the protective material of the invention is as four or five layers. The core of the material can be a woven or knitted fabric, such as might be used in ordinary clothing. This is coated on one side with a polymeric binder layer, into which the sorbent is mixed. The other side of the fabric is coated with a microporous support membrane, then overcoated with a very thin barrier layer. Optionally a highly permeable coating may be used on top of the permselective, or barrier, layer to seal and/or protect the membrane.

The resulting material permits relatively high rates of water vapor transmission, yet has extremely low permeability to organic vapors. The material is particularly useful in environments where low molecular weight, toxic organic materials, for example hydrazine, are used.

The finished material can be used to make protective suits or individual garments by methods known in the art, such as sewing, or sealing by heat or RF.

It is an object of the present invention to provide an improved protective clothing material.

It is an object of the invention to provide a protective clothing material with enhanced rejection characteristics for organic vapors.

It is an object of the invention to provide a breathable protective clothing material with enhanced rejection characteristics for organic vapors.

It is an object of the invention to provide a protective clothing material that is light and comfortable.

It is an object of the invention to provide a protective clothing material that has very low permeability for low-molecular-weight organic vapors combined with high permeability for water vapor.

Additional objects and advantages will be apparent from the description of the invention to those skilled in the art.

It is to be understood that both the general description above and the detailed description that follows are intended to be exemplary and explanatory, but do not restrict the scope of the invention in any way.

DETAILED DESCRIPTION OF THE INVENTION

The term "hydrophilic" as used herein refers to polymer films that have the ability to transport large volumes of water vapor through the film, by absorbing water on the side where the water vapor concentration is high, and desorbing or evaporating it on the side where the water vapor concentration is low. These dense continuous polymeric layers are not hydrophilic in the general sense of transporting water by capillary action or by wicking.

The term "fabric" as used herein is intended to be a general term encompassing any fabricated material, whether woven, non-woven or otherwise constructed.

The term "permselective" as used herein refers to polymers, or membranes made from those polymers, that exhibit selective permeation for at least one gas in a mixture over another gas in that mixture, enabling a measure of separation between those gases to be achieved.

The term "laminate" as used herein refers to a multilayer structure prepared by coating one or more layers onto a fabric layer.

Figure 1:
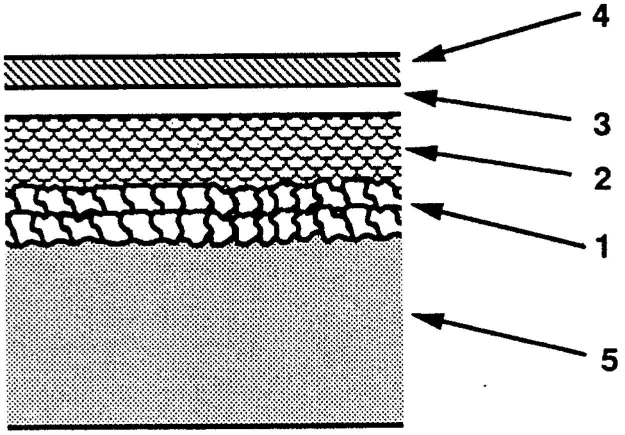
FIG. 1 shows a schematic diagram of a representative embodiment of the invention, having a fabric layer coated on opposite sides with a composite membrane layer and a sorbent layer.
Figure 2:
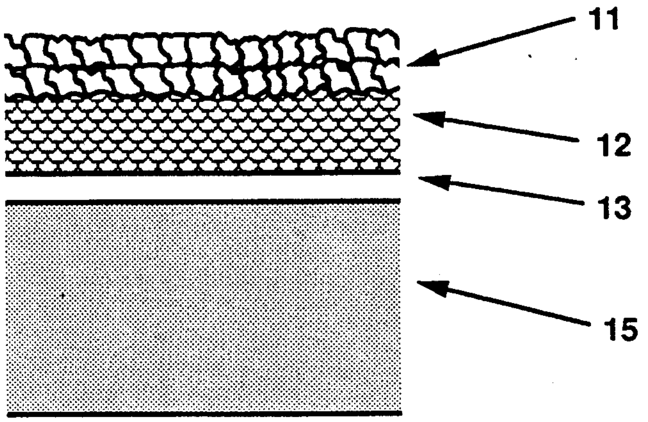
FIG. 2 shows an alternative embodiment, in which the sorbent layer is coated onto the composite membrane layer.
Figure 3:
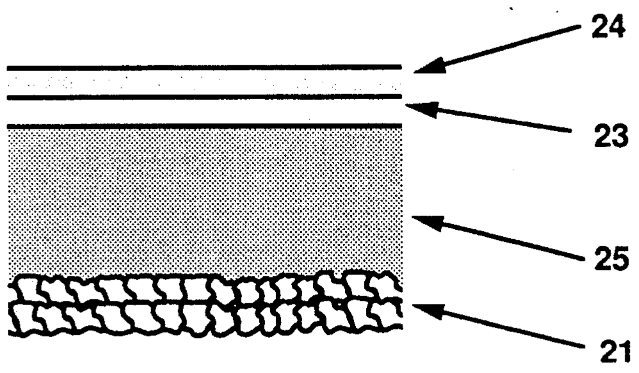
FIG. 3 shows an alternative embodiment, in which the sorbent layer forms the support layer for the permselective membrane.

The protective clothing material of the invention comprises three elements: a fabric layer, a thin-film composite membrane layer and a sorbent layer. In use, the material will normally be deployed with the sorbent layer closer to the skin than the membrane layer. In this configuration, the organic vapor reaching the sorbent layer will be limited to that which has passed through the membrane layer. Various arrangement of the layers with respect to one another are possible. Three non-limiting representative embodiments are shown in FIGS. 1–3. Depending on the fabrics, polymers, sorbents and so on used to manufacture the material, and the use to which it is to be put, any of these embodiments could be preferred. Embodiments without intermediate or top sealing layers are also possible.

Referring now to the drawings, FIG. 1 shows a preferred embodiment. The material consists of a fabric layer 1, onto one side of which a microporous support membrane, 2, is coated. The microporous support membrane strengthens the composite, but has essentially no selective properties. The microporous support layer is coated with an ultrathin, permeselective layer, 3. This layer determines the permeability characteristics of the composite membrane, and is permeable to water vapor but highly impermeable to organic vapors. Optional to layer, 4, protects the permselective layer from damage by abrasion and so on, and seals any minute pinholes or defects in the permselective layer. On the other side of the fabric web is coated a sorbent layer, 5. This layer would typically contain particles of activated carbon or the like, contained in a polymer film.

Referring now to FIG. 2, in this case fabric layer, 11, is coated with a microporous support membrane 12, which is overcoated with an ultrathin, permeselective layer, 13. The sorbent layer, 15, is coated onto the thin-film composite membrane, instead of onto the fabric layer. Such an embodiment would be preferred if there is a requirement for a specific external fabric surface, e.g. uniforms, camouflage, etc. Putting the fabric surface outermost could also protect the permselective membrane from abrasion. Referring now to FIG. 3, fabric layer, 21, is first coated with sorbent layer, 25. The sorbent layer both contains the sorbent material and forms the support membrane for the permselective membrane, 23. The composite membrane is optionally overcoated with protective or sealing layer, 24. An embodiment of this type has advantages in that the number of layers and coating oeprations required to manufacture the material is reduced. However, the preparation of a joint sorbent/support layer with acceptable properties is more difficult and may not be possible with some polymers.

The finished composite material should maximize the water vapor flux from the skin of the user, in conjunction with providing prolonged impermeability to toxic organic vapors.

Table 1 shows average perspiration rates, normalized to 100% RH, for individuals at different activity levels and ambient temperatures.

TABLE 1

Perspiration rates for different activities

| Activity | Temperature (°C.) | Perspiration rate ($g/m^2 \cdot hr$) |
|---|---|---|
| At rest | 22 | 25 |
| Indoor laboratory work | 29 | 125 |
| Moderate activity in shade | 30–35 | 250 |
| Heavy labor | 28–35 | 700 |
| Marching with load | 32 | 1,000 |

Based on these figures, a water vapor transmission rate of 50 $g/m^2$.h or above is preferred, more preferably 100 $g/m^2$.h or above, and most preferably 200 $g/m^2$.h or above. To determine the acceptable toxic vapor permeability, both the Emergency Exposure Limit (EEL) and the Threshold Limit Value (TLV) should be considered. For highly toxic vapors, such as might be encountered for instance in chemical warfare, as propellants in the aerospace industry, or as agricultural pesticides, the EEL may be as low as 10 ppm for exposure time of one hour, and the TLV, based on a time-weighted average, may be 1 ppm or less.

As an example of the manner in which the target organic vapor transmission rate may be calculated, Table 2 shows the Threshold Limit Value/Time Weighted Average (TLV-TWA) and the Emergency Exposure Limit (EEL) for hydrazine and nitrogen tetroxide.

TABLE 2

Concentration Limits for Hydrazine and Nitrogen Tetroxide

| Substance | Emergency Exposure Limit (ppm) 10 min | 30 min | 60 min | Threshold Limit Value Time Weighted Av (ppm) |
|---|---|---|---|---|
| Hydrazine | 30 | 20 | 10 | 0.1 |
| $N_2O_4$* | 30 | 20 | 10 | 3 |

*Expressed as $NO_2$

Assume that a leak occurs in which the organic vapor concentration in the environment rises to 500 ppm, and further assume that a worker wearing a suit made from the material of the invention must remain in that environment for one hour. In this case, the hydrazine and nitrogen tetroxide concentration inside the suit should not exceed the one-hour EEL values. If the suit has a surface area of 2 $m^2$ and the average distance between the suit and body is 5 cm, so that the suit's internal air volume is 100 liters, the permeability may be calculated as follows:

$$\text{target permeability} = \frac{\text{EEL (10 ppm)} \cdot \text{suit volume } (10^5\ cm^3)}{\text{suit area } (2 \times 10^4\ cm^2) \cdot \text{challenge concentration (500 ppm)} \cdot \text{time (3600 sec)}} = 2.8 \times 10^{-5}\ \text{cm/sec.}$$

For a challenge concentration of 5,000 ppm, the target value would be ten times lower ($2.8 \times 10^{-6}$ cm/sec) and for a challenge concentration of 50 ppm, the permeability would be ten times higher ($2.8 \times 10^{-4}$ cm/sec). At a challenge concentration of 500 ppm, the target permeability can be converted to a maximum allowable permeation rate for hydrazine of 0.7 $mg/m^2$.h, and for nitrogen dioxide of 1.0 $mg/m^2$.h.

If a material meets these target permeation rates, an eight-hour exposure to the organic vapor at the TLV level would result in an organic vapor concentration inside the suit of not higher than 16% of the TLV level. inside the suit of not higher than 16% of the TLV level.

The protective clothing material should, therefore, be able to maintain the concentration of organic vapor on the inside of the material below the EEL for one hour when exposed to relatively high challenge concentrations of 50 ppm, 500 ppm or above in the outside environment. This level of protection can be achieved by a combination of the protective properties of the membrane layer and the sorbent layer. For some vapors, the membrane permeability may be sufficiently low that the EEL and TLV targets can be maintained at all times, without the need for a sorbent layer at all. In the case of certain organic compounds, such as volatile organics with small molecules, however, better protection can often be achieved by the incorporation of the sorbent layer. The sorbent layer will scavenge the trace amounts of organic vapor permeating the membrane layer. When the sorbent becomes saturated, the protective properties of the material will be determined only by the rate of permeation of vapors through the membrane layer. The sorbent layer is thus used in conjunction with the membrane layer to delay the breakthrough time and the time at which the concentration within a garment manufactured from the protective clothing material reaches the EEL.

To achieve the target values, and the objects of the invention described above, combinations of sorbent layer properties and membrane layer properties can be chosen. A particular advantage of the invention is that the thickness and weight of the sorbent layer can be substantially less than would be required without the membrane layer, so the material is lighter, more breathable and more comfortable than other types of intermediate protective clothing.

Specific characteristics are demanded of the several layers comprising the protective clothing material. The preferred attributes and parameters associated with the various component layers are now discussed in turn.

1. The Fabric Layer

The permeability properties of the protective clothing material are not normally influenced by the fabric layer. The fabric layer contributes to properties such as ease of manufacture of the composite material, ease of garment fabrication, feel, comfort, mechanical strength, appearance and flame resistance. Production costs are also influenced by choice of fabric. Possible choices for this layer include, but are not limited to, natural clothing fabrics such as cotton, wool or linen; polyesters such as polyethylene terephthalate; polyamides, particularly nylons, such as Nylon 66, and aromatic polyamides; polyolefins including polyethylene, polypropylene and polytetrafluoroethylene; acrylics, for example polyacrylonitrile; polyimides, and combinations of the above. The fabric layer may be woven, knitted, non-woven, spun-bonded, felted or otherwise constructed. For good comfort and flexibility, it should preferably be porous or microporous, with a pore size of the order of up to a few microns. Non-flammable fabrics are preferred.

Specific examples of fabrics that may be used include grades of Hollytex®, a non-woven polyester fabric (Resource Technology Inc., Arcadia, Calif.), Nomex®, a polyamide, and Tyvek®, a spun-bonded polyethylene (both from E. I. DuPont de Nemours, Wilmington, Del.), and Goretex® a microporous polytetrafluoroethylene (PTFE), (W. L. Gore and Associates, Inc., Elkton, Md.). Particularly preferred fabrics are those made from nylon. Medium weight fibers and mesh sizes are preferred for good coating and adhesion of the membrane and sorbent layers. An especially preferred fabric is 70 Denier, 100×100 mesh woven nylon fabric from N. Erlanger Blumgart (New York, N.Y.).

The thickness of the fabric layer is not critical, but should generally be from about 100–500 microns, a typical value being 125 microns.

2. The Sorbent Layer

The sorbent layer acts as a scavenger of traces of organic vapor that may permeate the permselective layer. A variety of materials is known that can sorb and retain organic vapors, including activated carbon particles or fibers, zeolite particles or powders, porous polymeric particles, carbonaceous particles based on polymeric materials, and ion-exchange resins in particle or granule form. Specific examples of sorbents suitable for use in the present invention are activated carbon (WPL40, 97% 325+ mesh, Calgon Carbon Corp., Pittsburgh, Pa.), and Amberlyst® XN1010 (Rohm & Haas Co., Philadelphia, Pa.), a cationic exchange resin with stronger, but more specific, sorbent capabilities. Activated carbon is preferred. The sorbent is contained in a polymer layer that carries the sorbent and binds the sorbent layer to the fabric layer. This polymer layer is preferably microporous. Polymers that may be used to carry the sorbent include polysulfone, polyethylene, polytetrafluoroethylene, polyvinlyidene fluoride, polyurethane, polypropylene, and polyamide, and copolymers such as polyamidepolyether block copolymers. Rubbery polymers are preferred for softness and flexibility of the resulting material.

The sorbent layer is preferably deposited on the fabric layer by solvent casting. The sorbent is mixed into a solution of the polymer and the resulting mixture is cast onto one side of the fabric layer using the same general procedure as described below for forming the support membrane. A preferred polymer for use as carrier for the sorbent is polyurethane, for example, Pellethane (Dow Chemical Co., Midland, Mich.) or Estane® (B. F. Goodrich, Akron, Ohio).

The loading of the sorbent in the polymer and the thickness of the sorbent layer can be tailored to optimize the properties of the protective clothing material. The quantity of sorbent that will be needed will vary according to the use to which the material is to be put and the capability of the thin-film composite membrane to resist permeation of the organic agent to which it is exposed. In general, the thickness, weight and loading of the sorbent layer will be smaller than is needed in conventional materials that rely for their protective qualities on a sorbent layer alone. A loading of less than 200 $g/m^2$ is preferred, and a loading less than 120 $g/m^2$ is most preferred. The sorbent layer has an adverse effect on water vapor permeation, so it should be kept as thin as possible. A thickness less than 500 $\mu m$ and ideally less than about 350 $\mu m$ is preferred. One skilled in the art will recognise that the thickness and loading of the sorbent layer can be varied to suit the application to which the material is to be put and the degree of protection required.

3. The Membrane Layer

The membrane layer is a thin-film composite membrane having at least a microporous support membrane and an ultrathin permselective membrane, with optional sealing and protective layers between the support and permselective membranes or on top of the permselective membrane.

The microporous support membrane: The microporous support membrane has no permselective properties of itself, but provides strength and toughness to the composite membrane. It also provides a smooth, relatively defect-free surface onto which the permselective membrane is coated. It should have a flow resistance that is very small compared to the permselective barrier layer. Microporous support membranes with nitrogen fluxes of the order $1\times10^{-2}$ $cm^3(STP)/cm^2.s.cmHg$ or above are preferred. A preferred support membrane is an asymmetric Loeb-Sourirajan type membrane, which consists of a relatively open, porous substrate with a thin, dense, finely porous skin layer. Preparation of asymmetric polymer membranes is known in the membrane making art and is described, for example, in an article by H. Strathmann et al. entitled "The formation mechanism of asymmetric membranes", in Desalination, Vol. 16, 175 (1975). Preferably the pores in the skin layer should be less than 1 micron in diameter, to enable it to be coated with a defect-free permselective layer. Simple isotropic supports, such as microporous polypropylene or polytetrafluoroethylene can also be used.

The support membrane should resist the solvents used in applying the permselective layer. Polyimide or polysulfone supports offer good solvent resistance. Polymers which may be used to make the microporous support membrane include, but are in no way limited to, polysulfones, such as Udel P3500® (Union Carbide, Danbury, Conn.) polyaramids, for example Nomex® (DuPont, Wilmington, Del.), polyimides, such as Kapton® (DuPont), polyetherether ketones, such as Victrex® (ICI Americas Inc., Wilmington, Del.), polyvinylidine fluoride, such as Kynar® (Pennwalt Corporation, Philadelphia, Penn.), polyamides, such as Trogamid® (Dynamit Nobel Corp. of America, Stony Point N.Y.) and polyurethanes (Pellethane®, Dow Chemical Co., Midland Mich.).

For good water vapor transmission proerties, the support membrane should preferably be hydrophilic. Particularly preferred polymers for making the microporous support membrane are polyamides, which yield flexible membranes with a smooth-skinned surface.

In the embodiment of FIG. 1, for example, the microporous support membrane is deposited on the side of the fabric layer that is not coated with the sorbent layer. The casting operation can be performed as follows. A casting solution, consisting of a solution of polymer in a water-miscible solvent, is doctored on to a moving belt of the fabric web. The belt then passes into a water bath which precipitates the polymer to form the membrane. The membrane passes through a spray-wash station and a water-rinse tank to remove any residual solvent before being dried and collected on a take-up roll.

The support membrane should be sufficiently thick to provide the membrane layer with a measure of robustness to withstand normal use, but not so thick as to impair the flexibility or permeability characteristics of the final material. Generally a thickness of 30–200 microns, is envisaged, with a preferred thickness of approximately 50–150 microns.

It is most preferred that the permselective membrane is coated directly onto the microporous support membrane. However, optional embodiments in which a sealing layer is used between the two are within the scope of the invention.

The purpose of the optional second layer is to provide a sealing coat for the microporous support, thereby ensuring a very smooth defect-free surface onto which the permselective layer can be deposited. Materials for use as the sealing layer should have a high permeability for water vapor, so as not to reduce the body-fluid transport efficiency of the composite membrane. They should also be capable of wetting the microporous layer in such a way as to form a smooth, continuous coat. In general, rubbery materials are preferred, because of their permeability and flexibility properties. Rubbery polymers that could be used for the sealing layer include natural and synthetic rubbers, for example nitrile rubber, neoprene, siloxane polymers, chlorosulfonated polyethylene, polysilicone-carbonate copolymer, fluoroelastomer, polybutadiene, polyisoprene, and poly(butene-1). The most preferred material for the sealing coat is silicone rubber, which has good permeability characteristics, is fire resistant and wets the microporous support freely in solution. Constituents for preparing silicone rubber, such as polymerizable oligomers or linear polymers, may be obtained from General Electric Co., Waterford, N.Y., or Dow Corning Co. Midland, Mich.) Silicone rubber is very permeable, and silicone rubber layers can easily be made thin enough by the techniques hereinafter described in detail to allow a high water vapor flux. The thickness of the sealing layer should preferably be less than 10 microns, generally in the range 0.5 to 5 microns, and ideally 2 microns or less. In embodiments employing a protective top layer, the above discussion of properties, choices of polymers and so on, would also apply to the selection of an appropriate top surface layer.

The sealing layer covers any defects in the microporous support membrane. The sealed support membrane can be tested for integrity by measuring its permeabilities to oxygen and nitrogen. When coated with silicone rubber, for example, the sealed support, if defect-free, should exhibit an oxygen/nitrogen selectivity greater than 2.0.

The permselective membrane: Selection of an appropriate material for the permselective top layer of the composite material is important, because it is this layer that makes a key contribution to the permeability and rejection properties of the finished garment. Because of its dense, non-porous structure, the coating will be impermeable to liquids and aerosols. It must have the best possible rejection characteristics for organic vapors, yet remain sufficiently permeable to water vapor to minimize heat stress problems in the user. A difference in membrane permeability between the organic vapor and water vapor of at least a factor of ten, more preferably a factor of 100, and most preferably a factor of 1,000 or more is desirable.

Permeation rates through dense polymer membranes are given by the equation:

$$J = \frac{DK\Delta C}{l}$$

where J is the transmembrane flux (g/cm$^2$.sec), $\Delta C$ is the concentration gradient of permeant across the membrane (g/cm$^3$), l is the membrane thickness (cm), D is the diffusion coefficient of the permeant in the membrane (reflecting the mobility of the permeant), and K is the partition coefficient (reflecting the solubility of the permeant in the membrane).

To obtain the required difference in the flux of water vapor and organic vapors through the membrane material, the values of D and K must be maximized for water and minimized for organic vapors. In very flexible backbone polymers, such as silicone rubber, the forces restraining the reorientation of the polymer chains to allow passage of the permeant are low, and thus the diffusion coefficient of both permeants is very high. Diffusion coefficients in silicone rubber also decrease only slowly as the molecular weight of the permeant is increased. In contrast, the forces restraining reorientation of polymer chains in rigid polymers are much larger. As a result, diffusion coefficients of larger permeants in these polymers are much lower than in silicone rubber. Moreover, because the number of polymer chains required to reorientate increases as the size of the permeant increases, diffusion coefficients decrease very rapidly with increasing molecular size. Even relatively small organic molecules, such as hydrazine or nitrogen tetroxide, both highly toxic agents used as propellants in the aerospace industry, will be many times less permeable through these rigid polymers than the small, highly polar and condensable water molecule. It follows that the separation of permeants such as water and organic vapors can best be achieved with polymers with low polymer chain flexibilities. This concept is discussed in detail in a paper by R. W. Baker and H. K. Lonsdale entitled "Controlled Release Mechanisms and Rates" in *Controlled Release of Biologically Active Agents*, A. C. Tanqueray and R. E. Lacey (Eds.), Plenum Press, New York (1974).

One method of decreasing chain flexibility is to crosslink the polymer. For example, R. M. Barrer and G. Skirrow, in an article entitled "Transport and Equilibrium Phenomena in Gas-Elastomer Systems I. Kinetic Phenomena," *J. Poly. Sci.* 3,549 (1948), showed that with a series of sulfur-crosslinked rubbers the diffusion coefficient becomes smaller as the degree of crosslinking is increased. There is an approximate linear dependence of D on the reciprocal of the molecular weight between crosslinks. Similar effects have been observed by Stannett et al. with radiation-crosslinked polyethylene. (V. Stannett, M. Szwarc, R. L. Bharagava, J. A. Meyer, A. W. Meyers and C. E. Rogers, "Permeability of Plastic Films and Coated Paper to Gases and Vapors," Tappi Monograph #23, New York, 1962). Crystalline or glassy regions in the polymer can also act as pseudo crosslinks.

The second factor influencing permeant flux is the distribution coefficient of the permeant in the membrane. This coefficient is sensitive to both the polarity and morphology of the permeant. Theories of solubility exist, but at the present time the ability to predict permeant solubilities in polymers is rudimentary. However, a useful guide is the solubility parameter concept described by J. Hilderbrand and R. Scott, in *The Solubility of Non-Electrolytes*, Reinhold Publishing Corp., New York, 1949. The solubility parameter is valuable in predicting solubilities and sorption in polymers since it can be shown that a polymer will most efficiently sorb the material whose solubility parameter is closest to its own. The solubility parameter for water is 25, while those for organic molecules such as common hazardous amines are between 10 and 14. Thus it is to be expected that highly polar polymer membranes, or even charged membranes with high solubility parameters will have the maximum partition coefficients for water and minimum for toxic vapors.

The preferred permselective membrane then will normally be made from a hydrophilic, polar polymer with a relatively rigid structure, such as crosslinked or glassy polymers. Examples of polymers which can be employed in the practice of this invention are included in U.S. Pat. No. 4,486,202 to Malon et al., column 6, line 37 through column 7, line 7., which patent is incorporated herein by reference. Specific polymers that may be useful include cellulose derivatives, ethylcellulose, nitrocellulose and cellulose esters, e.g. cellulose acetates, nitrates and butyrates, acrylate polymers and copolymers, polyacrylonitrile and acrylonitrile copolymers, polyamides, polyimides, and rigid grades of polyurethanes. Particularly useful are cellulose acetates, such as cellulose diacetate, cellulose triacetate, and cellulose acetate propionate. An especially preferred polymer for the permselective membrane is cellulose triacetate.

A permselective membrane may then be prepared on the microporous support membrane by a number of techniques known in the art. There are two preferred methods in the context of the present invention; coating with a dilute polymer solution and interfacial polymerization. The former is described in detail in, for example, a paper by R. L. Riley, H. K. Lonsdale, D. R. Lyons and U. Merten, entitled "Preparation of Ultrathin Reverse Osmosis Membranes and the Attainment of the Theoretical Salt Rejection" in *J. Appl. Poly. Sci.* 11, 2143, 1967; and in a recent U.S. Pat. No. 4,234,701 to R. L. Riley and R. L. Grabowsky. In this method, a very dilute solution of the desired polymer is prepared in a volatile solvent. A thin film of the polymer solution is deposited on the microporous support surface by immersing and then slowly withdrawing the support from the solution. When the solvent evaporates, an extremely thin polymer layer is left behind. Alternatively, the thin polymer film can be deposited first on a surface such as a glass plate, and then floated off onto a water surface and deposited on the microporous substrate in a separate operation. In a typical dip-coating operation, the support membrane passes from a feed roll across a series of rollers into a dip-coating tank. The dip coating tank contains a dilute solution of the polymer to be deposited, which coats the travelling membrane support with a liquid layer 50 to 100 microns thick. The membrane then passes through a drying oven and is wound up on a variable-speed, motor-driven take-up roll. After evaporation of the solvent, a polymer film 0.1 to 20 microns thick is left on the membrane. The thickness and the number of defects in the coating depend on the concentration and viscosity of the solutions involved, the nature of the support membrane and the application parameters of the process. With skilful tailoring of these variables, it is possible to obtain a defect-free sealing layer or top layer as thin as 0.7 micron and a permselective layer as thin as 0.1 micron. The preferred thickness for the permselective membrane is less than 5 microns, more preferably less than 2 microns.

Interfacial polymerization, an alternative preferred method of forming a permselective layer on top of a microporous support, is discussed in detail in, for example, a paper entitled "Non-Polysaccharide Membranes for Reverse Osmosis: NS-100 Membranes," by L. T. Rozelle, J. E. Cadotte, K. E. Cobian and C. V. Koppfer in *Reverse Osmosis and Synthetic Membranes*, S. Sourirajan (Ed.), National Research Council of Canada, Ottawa, 1977. The principle of the method involves bringing two reactive monomers, each in different immiscible solvents, into contact. The monomers are able to react only at the interface of the two liquids, where a polymer film forms. The concept is applied to the preparation of composite membranes by first depositing a solution of a reactive prepolymer in a surface pores of the microporous substrate. The membrane is then immersed in a solution of a reactant that causes the polymer to polymerize further and/or crosslink. Finally the membrane is dried at an elevated temperature. The chemistry of interfacial polymerization makes this method particularly desirable where highly crosslinked hydrophilic polymer end products are needed. Depending on the conditions under which the polymerization is carried out, and the nature of the prepolymers, reactants and solvents used, it is possible to vary the thickness and properties of the resulting barrier films in the same way as with the coating method.

The optional overcoat: Optionally the permselective membrane may be overcoated with a sealing or protective layer. This layer will protect the permselective membrane from damage by abrasion and so forth. It may also serve to seal any minute defects in the permselective layer, so that the low intrinsic permeability of the permselective membrane to organic vapors may be utilized as fully as possible.

The criteria for selecting polymers and for carrying out the coating procedure are the same as those discussed above for sealing layers used between the microporous support membrane and the permselective membrane.

The thickness of the overcoat sealing layer should preferably be less than 5 microns.

The composite fabric material described above may be used to make protective clothing, either in the form of complete suits, or individual garments, by a variety of techniques known in the art. The simplest method is conventional sewing. In this case an adhesive or sealant should be incorporated into the seams to prevent leaking. Other methods that can be used include, but are not limited to, adhesive bonding, with or without the application of heat or pressure or both, or electronic bonding, particularly by means of radio frequency heating.

The processes and components described above result in a composite fabric material that has improved resistance to permeation by toxic vapors and good water vapor and heat transmission properties. The water vapor transmission rate is 50 $g/m^2.h$ or above, normalized to 100% RH. The organic vapor transmission properties are such that a concentration on the skin proximal side of the material can be maintained less than the Emergency Exposure Limit for one hour against a challenge concentration of 500 ppm or greater on the skin distal side. Furthermore, polymers can be chosen for the various layers which have a reasonable measure of flammability resistance, thereby affording some emergency fire protection to the wearer. From the description of the techniques for constructing the composite material above, it will be apparent that the finished material has a very smooth, non-porous surface. This is extremely advantageous, since toxic agents in liquid or aerosol form will not be able to penetrate. In addition the surface of the garment can be cleaned by simple flushing with running water.

Although protective garments are the principal application of the material of the invention, it has other uses which are also intended to be encompassed by the scope of the invention. For instance, the material may be used to make tents and shelters for use in chemical warfare situations. The material may also find application in packaging operations where it is desired to prevent organic vapors entering or leaving.

The following examples are given by way of illustration to further clarify the nature of the invention. They are not exclusive.

EXAMPLES

Test Apparatus

The apparatus for measuring the permeation rates of water vapor and chemical agent vapors was constructed entirely from glass, and the inner surfaces of all the tubes and vessels were coated with paraffin wax, to prevent corrosion of the apparatus, or sorption into the apparatus, of chemical agents.

The apparatus consisted of two sections: (1) a challenge stream generation section, and (2) a two-chambered glass test cell. The challenge stream generation section provided a means of generating an airstream with a specific challenge concentration of the vapor. This was achieved by interchangeable sets of saturators that contained liquid organic agent or water. To generate a challenge stream, dry nitrogen from a commercial gas cylinder at room temperature (25° C.) was bubbled through the saturators to saturate it with the appropriate vapor. The saturators were immersed in a controlled temperature water bath and the vapor content of the saturated nitrogen stream was regulated by adjusting the temperature of the saturators. The nitrogen stream that passed through the saturators was mixed with an additional quantity of dry nitrogen to dilute the vapor concentration to the desired challenge concentration. For tests with gaseous samples, a gas cylinder was used in place of the saturators to deliver the challenge stream.

The second section of the apparatus, the test cell, consisted of a two-chambered glass cell. A sample of the test material was mounted between the two chambers. Ports enabled the challenge stream to be sampled before and after it had contacted the test specimen. The permeate chamber was swept with a stream of dry nitrogen at a regulated flow rate. Ports enabled the composition of the clean sweep stream, the contaminated sweep stream and the atmosphere within the collection chamber, respectively, to be determined. The permeate chamber was stirred by a magnetic stirrer bar to create turbulence within the chamber and minimize boundary layer effects.

Samples of the protective material, and the several individual layers contributing to it, were tested with a variety of permeants. Permeation tests were carried out with pure streams of oxygen and nitrogen, to determine the integrity of the various layers. Water vapor permeation rates were also measured. Extensive tests on all components were performed with nitrogen dioxide ($NO_2$) and hydrazine ($N_2H_4$). These vapors were used as representative of toxic organic agents with small molecules. A series of tests with other organic vapors representative of diverse classes of compounds was also done.

EXAMPLE 1

Evaluation of Candidates for the Fabric Layer

This set of experiments was designed to evaluate the performance of various fabrics in terms of appearance, feel, flexibility and ability to provide an adequate substrate for the membrane layer. A standard casting solution, 18% Trogamid-T, 3% acetic acid and 79% DMF, was used in each case. The casting thickness was 200 μm or 300 μm. The solution temperature and quench bath temperature were both 17° C. The results are summarized in Table 3.

TABLE 3

Permeation Rates and Feel Assessment for Fabric/Microporous Support Membrane Combinations

| Fabric | Cast film thickness (μm) | $N_2$ Permeation Rate (cm³ (STP)/cm² sec cmHg) | Feel |
|---|---|---|---|
| Hollytex ® | 200 | $2.4 \times 10^{-2}$ | A |
| Kendall | 200 | $2.7 \times 10^{-3}$ | A |
| Nylon | 200 | $1.1 \times 10^{-2}$ | B |
| Polyester | 300 | $3.9 \times 10^{-2}$ | B |
| Tyvek ® | 200 | $2.4 \times 10^{-3}$ | A |
| Cotton | 200 | $2.6 \times 10^{-1}$ | B |
| Chintz | 300 | $5.3 \times 10^{-2}$ | B |
| Sateen | 300 | $1.7 \times 10^{-1}$ | B |
| Poplin | 300 | $6.0 \times 10^{-2}$ | B |

A = Stiff, paper-like feel
B = Soft, flexible feel

Hollytex ® and Kendall ® are nonwoven polyolefin webs with a paper-like feel and texture. Tyvek ® is a high density polyethylene spun-bonded fiber. Nylon is a 70 Denier, 100×100 mesh woven nylon fabric from N. Erlanger Blumgart (New York, N.Y.).

EXAMPLE 2

Microporous Support Membrane Preparation, with Sealing Layer

Microporous support membranes on fabric layers as in Example 1 were coated with a sealing layer of silicone rubber. The silicone rubber coating was deposited by dip-coating, using a 1% silicone rubber in iso-octane solution. The resulting material was tested for oxygen and nitrogen permeability. A good support membrane has a smooth, essentially defect-free surface and, therefore, an ultrathin, defect-free layer of silicone rubber forms over the support membrane. Such a membrane has a selectivity to oxygen over nitrogen of about 2. The permeability data and selectivities are listed in Table 4.

TABLE 4

Permeation Rates and Selectivities for the Membranes of Example 1 coated with Silicone Rubber

| Fabric | $N_2$ Permeation Rate (cm³ (STP)/cm² sec cmHg) | $O_2$ Permeation Rate (cm³ (STP)/cm² sec cmHg) | Selectivity $O_2/N_2$ |
|---|---|---|---|
| Hollytex ® | $2.9 \times 10^{-4}$ | $5.5 \times 10^{-4}$ | 1.9 |
| Kendall | $2.0 \times 10^{-4}$ | $3.2 \times 10^{-4}$ | 1.6 |
| Nylon | $2.0 \times 10^{-4}$ | $3.9 \times 10^{-4}$ | 2.0 |

TABLE 4-continued

| Permeation Rates and Selectivities for the Membranes of Example 1 coated with Silicone Rubber | | | |
|---|---|---|---|
| Fabric | $N_2$ Permeation Rate ($cm^3$ (STP)/$cm^2$ sec cmHg) | $O_2$ Permeation Rate | Selectivity $O_2/N_2$ |
| Polyester | $1.8 \times 10^{-4}$ | $1.5 \times 10^{-4}$ | 0.8 |
| Tyvek ® | $5.1 \times 10^{-5}$ | $1.0 \times 10^{-4}$ | 2.0 |
| Cotton | $3.1 \times 10^{-2}$ | $1.9 \times 10^{-2}$ | 0.6 |
| Chintz | $7.6 \times 10^{-4}$ | $9.2 \times 10^{-4}$ | 1.2 |
| Sateen | $3.7 \times 10^{-2}$ | $3.3 \times 10^{-2}$ | 0.9 |
| Poplin | $4.1 \times 10^{-4}$ | $6.1 \times 10^{-4}$ | 1.5 |

Comparing Tables 3 and 4, it may be seen that the best combination of feel and membrane integrity was obtained with the nylon fabric.

EXAMPLE 3

Comparison of Microporous Support Membranes

Membranes were prepared on a nylon support as in Examples 1 and 2. The gas permeation rates and selectivities were measured and are listed in Table 5.

TABLE 5

| Comparison of microporous support membranes cast on nylon fabric | | | | |
|---|---|---|---|---|
| Support Membrane | Cast Film Thickness (μm) | $N_2$ Permeation Rate ($cm^3$ (STP)/$cm^2$ sec cmHg) Uncoated | Coated | Selectivity $O_2/N_2$ |
| Trogamid | 200 | $1.1 \times 10^{-2}$ | $2.0 \times 10^{-4}$ | 2.0 |
| Kynar | 200 | $8.2 \times 10^{-2}$ | $6.8 \times 10^{-5}$ | 1.3 |

Kynar ® is polyvinylidene fluoride

EXAMPLE 4

Thin-film Composite Membrane Preparation. Water Vapor Results

Thin-film composite membranes were prepared as follows. A Trogamid ® microporous support membrane was solution cast onto a nylon fabric as in Example 1. Ultrathin permselective membranes of various polymers were dip-coated onto the microporous support. The water vapor permeation rates of the materials were measured in the test cell. The results are summarized in Table 5.

TABLE 5

| Water Vapor Permeation Rates of Thin-film Composite Membranes | |
|---|---|
| Permselective Membrane | Water Vapor Permeation Rate ($g/m^2 \cdot h \cdot$ 100% RH) |
| Cellulose triacetate | 165 |
| Cellulose acetate propionate | 53 |
| Cellulose diacetate | 102 |
| Poly(etherimide) | 46 |
| Nitrocellulose | 32 |
| Poly(ethylmethacrylate) | 29 |
| Poly(vinylalcohol) | 80 |
| Poly(ethylene vinylacetate) | 20 |
| Cellulose acetate butyrate | 56 |
| Poly(ether-ester-amide) | 233 |
| Silicone rubber | 117 |
| Ethylcellulose | 60 |

EXAMPLE 5

Thin-film Composite Membrane Preparation. Nitrogen Dioxide Tests

Thin-film composite membranes were prepared as follows. A Trogamid ® microporous support membrane was solution cast on the nylon fabric of Example 1. Ultrathin permselective membranes of various polymers were dip-coated onto the microporous support. The nitrogen dioxide permeation rates of the materials were measured in the test cell. The results are summarized in Table 6.

TABLE 6

| Nitrogen Dioxide Permeation Rates of Thin-film Composite Membranes | |
|---|---|
| Permselective Membrane | Nitrogen Dioxide Permeation Rate ($mg/m^2 \cdot h$) |
| Cellulose triacetate | <1 |
| Cellulose acetate propionate | <1 |
| Cellulose diacetate | 5.2 |
| Poly(etherimide) | <1 |
| Nitrocellulose | <1 |
| Poly(ethylmethacrylate) | 0.7 |
| Poly(vinylalcohol) | 5 |
| Poly(ethylene vinylacetate) | 97 |
| Cellulose acetate butyrate | 73 |
| Poly(ether-ester-amide) | 30 |
| Silicone rubber | <200 |
| Ethylcellulose | 84 |

The target nitrogen dioxide permeation rate that would enable the protective material to meet both the one-hour EEL, and the TLV for eight hours or more, is 1 $mg/m^2$.h. It can be seen that several materials already met this standard, even without a sorbent layer.

EXAMPLE 6

Thin-film Composite Membrane Preparation. Hydrazine Tests

Thin-film composite membranes were prepared as in Example 5. Membranes with cellulose triacetate, cellulose acetate propionate and cellulose diacetate as the selective layer were tested against hydrazine, but were unable to resist the permeation of hydrazine. The hydrazine permeation rate through the membranes was 35 $mg/m^2$.h or more, 50 times greater than the target value of 0.7 $mg/m^2$.h, in all cases. The thin-film composite membranes with cellulose triacetate permselective membranes had the lowest hydrazine permeation rate.

EXAMPLE 7

Effect of Overcoat Sealing Layer

A thin-film composite membrane was prepared as follows. A Trogamid ® microporous support membrane was solution cast onto a nylon fabric as in Example 1. An ultrathin permselective membrane of cellulose triacetate was coated onto the microporous support. The cellulose acetate coating solution comprised 0.75% cellulose triacetate in 1,1,2-trichloroethane. Cellulose triacetate has an intrinsic oxygen/nitrogen selectivity of about 3-3.5. The oxygen and nitrogen permeation rates of the material were measured, and the oxygen/nitrogen selectivity was determined. An overcoat of poly(-dimethylsiloxane) (Wacker Silicones, Adrian Mich.) was dip-coated onto the permselective membrane surface. The permeation experiments were repeated. The results are summarized in Table 7. As can be seen, the overcoat layer enabled the performance of the cellulose triacetate membrane to approach the intrinsic properties of a perfect film of cellulose triacetate.

TABLE 7

| Permeation and Selectivity Data for Thin-Film Composite Membrane on a Nylon Fabric with and without Overcoat | | | |
|---|---|---|---|
| | Permeation Rate ($cm^3$ (STP)/$cm^2 \cdot s \cdot cmHg$) | | Selectivity |
| | $N_2$ | $O_2$ | Oxygen/Nitrogen |
| Before overcoat | $1.5 \times 10^{-5}$ | $1.6 \times 10^{-5}$ | 1.1 |
| After overcoat | $1.1 \times 10^{-6}$ | $3.1 \times 10^{-6}$ | 2.8 |

EXAMPLE 8

Permeation Results With Sorbent Layer Added

A protective clothing material was prepared as in Example 7, including the silicone rubber overcoat layer. A sorbent layer was prepared by blending activated carbon particles into a solution of polyurethane (Pellethane, Dow Chemical Co., Midland, Mich.), in a carbon:polyurethane ratio of 2:1. The carbon particles consisted of activated carbon, grade WPL40, 97% 325+mesh (Calgon Carbon Corp., Pittsburgh, Pa.). The resulting mixture was cast onto the side of the fabric not coated with the thin-film composite membrane, using the same general procedure as was used for casting the support membrane. The casting thickness was 500 microns. The resulting material was tested for water vapor and nitrogen dioxide permeability. The results are summarized in Table 8. Water vapor permeability was approximately half that measured for an identical membrane without the sorbent layer.

TABLE 8

| Permeation Rates of Protective Clothing Materials | | | | |
|---|---|---|---|---|
| Composite | Normalized flux ($10^{-5}$ $cm^3$ (STP)/$cm^2 \cdot s \cdot cmHg$) | | Mass flux $NO_2$ | Mass flux $H_2O$ |
| material | $N_2$ | $O_2$ | ($mg/m^2 \cdot h$) | ($g/m^2 \cdot h \cdot$ 100% RH) |
| Cellulose triacetate without sorbent | 0.05 | 0.10 | <1 | 123 |
| Cellulose triacetate with sorbent | 0.24 | 0.38 | <1 | 58.9 |

EXAMPLE 9

Hydrazine Breakthrough Time Measurements

Figure 4:
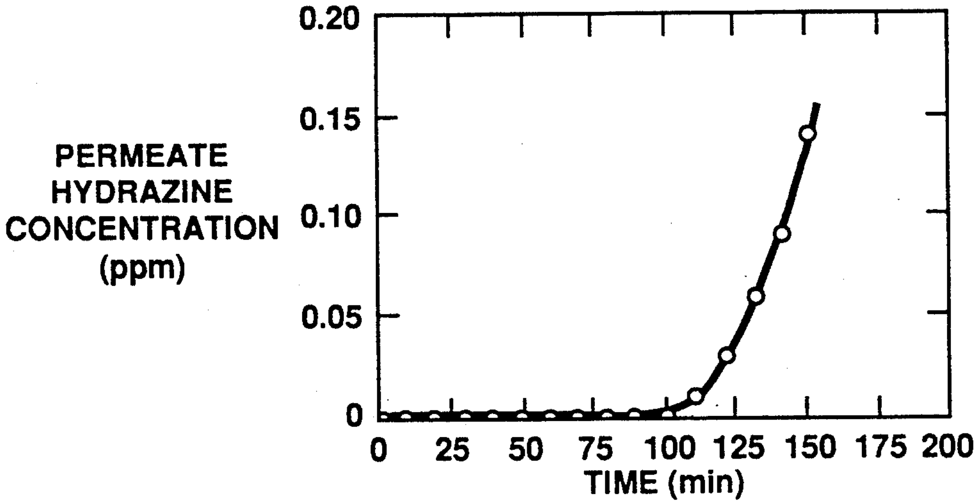
FIG. 4 is a graph of permeate hydrazine concentration against time measured with a protective clothing material sample exposed to a challenge hydrazine concentration of 500 ppm.
Figure 5:
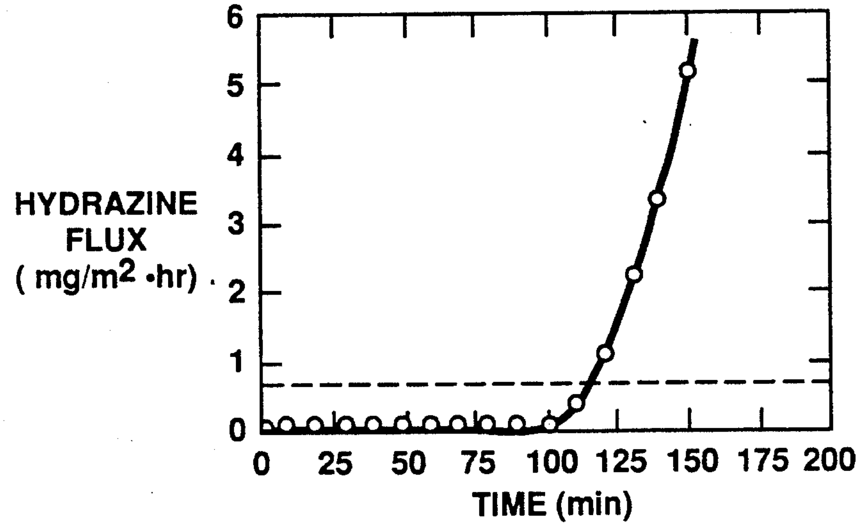
FIG. 5 is a graph of permeate hydrazine flux against time measured with a protective clothing material sample exposed to a challenge hydrazine concentration of 500 ppm.

A protective clothing material was made as follows. A Trogamid® microporous support membrane was solution cast onto a nylon fabric as in Example 1. An ultrathin permselective membrane of cellulose triacetate was coated onto the microporous support. A sorbent layer was prepared by blending activated carbon particles into a solution of polyurethane (Pellethane, Dow Chemical Co., Midland, Mich.), in a carbon:polyurethane ratio of 2:1. The carbon particles consisted of activated carbon, grade WPL40, 97% 325+mesh (Calgon Carbon Corp., Pittsburg, Pa.). The resulting mixture was cast onto the side of the fabric not coated with the thin-film composite membrane, using the same general procedure as was used for forming the support membrane. The casting thickness was 500 μm. The resulting material was similar to that used in Example 8. The material was mounted in the test cell and exposed to a continuous challenge concentration of 500 ppm hydrazine. The first detectable trace of hydrazine was 0.01 ppm after 110 minutes of exposure to 500 ppm. The results are summarized in FIGS. 4 and 5. The material exceeds the one-hour EEL requirement of 10 ppm. The TLV level of 0.1 ppm was not reached until two-and-a-half hours after initial exposure.

EXAMPLE 10

Hydrazine Breakthrough Experiments With Other Membranes

Protective clothing materials were prepared using the same recipes and techniques as in Example 9, but with a variety of permselective membranes. The hydrazine breakthrough time for each was measured by the same procedure as in Example 9. The results are summarized in Table 9. The challenge hydrazine concentration was 500 ppm. The tests were performed with an air sweep of 800 mL/min on the permeate side. The lower limit for hydrazine detection was 1 ppm.

TABLE 9

| Hydrazine Breakthrough Time for Protective Materials Using Various Permselective Membranes | |
|---|---|
| Permselective Membrane | Breakthrough Time (min) |
| Nitrocellulose | 14 |
| Poly(etherimide) | 9 |
| Poly(ethylmethacrylate) | 7 |
| Polystyrene* | 16 |
| Nitrocellulose* | 19 |

*Higher density Trogamid support

EXAMPLE 11

Dimethylformamide Permeation Test

A protective clothing material was prepared as in Example 9. The material was evaluated against a challenge concentration of 500 ppm N-dimethylformamide using the procedure as in Example 9. The TLV for prolonged exposure to DMF is 10 ppm. When continuously exposed to the challenge concentration of 500 ppm, the material maintained a DMF concentration less than the TLV on the permeate side for 2 hours 20 min. In a comparative test under identical conditions, a Tyvek® 1422A sample yielded a DMF concentration that exceeded the TLV in about 40 minutes.

EXAMPLE 12

Hexane Permeation Test

A protective clothing material was prepared as in Example 9 and tested with hexane. The test method was similar to the standard test method for resistance of protective clothing materials to permeation by hazardous liquid chemicals (ASTM F 739-81). A standard test cell (Pesca Lab Sales, Kennett Square, Pa.) was used. A material sample was clamped between the two halves of the cell, with the permselective layer facing the challenge chamber and the carbon layer facing the sampling chamber. A small quantity of N-hexane was introduced into the challenge chamber, which was kept at an inclination so that the liquid did not contact the surface of the membrane. The liquid evaporated and the air within the cell was rapidly saturated with hexane vapor. The cell was operated in "closed cell" mode. The collection chamber was sealed and very small quantities of air were removed periodically for analysis through a rubber septum with a gastight syringe. Fresh volumes of nitrogen were added to replace the gas volumes removed during sampling. The samples were analyzed using a gas chromatograph equipped with a flame ionization detector. Comparative experiments were performed with the material of Example 9 and with Tyvek® 1422A.

The TLV for prolonged exposure to N-hexane is 300 ppm. The short-term exposure limit (STEL), is 1,800 ppm for 15 minutes. The challenge concentration was saturation concentration, i.e. at least 200,000 ppm at 25° C. When continuously exposed to the challenge concentration the material maintained a hexane concentration below the TLV for more than 30 hours. In a comparative test performed under identical conditions, the hexane concentration on the permeate side of a Tyvek sample exceeded the TLV in less than a minute.

EXAMPLE 13

Comparison of Toluene Breakthrough Time

Figure 6:
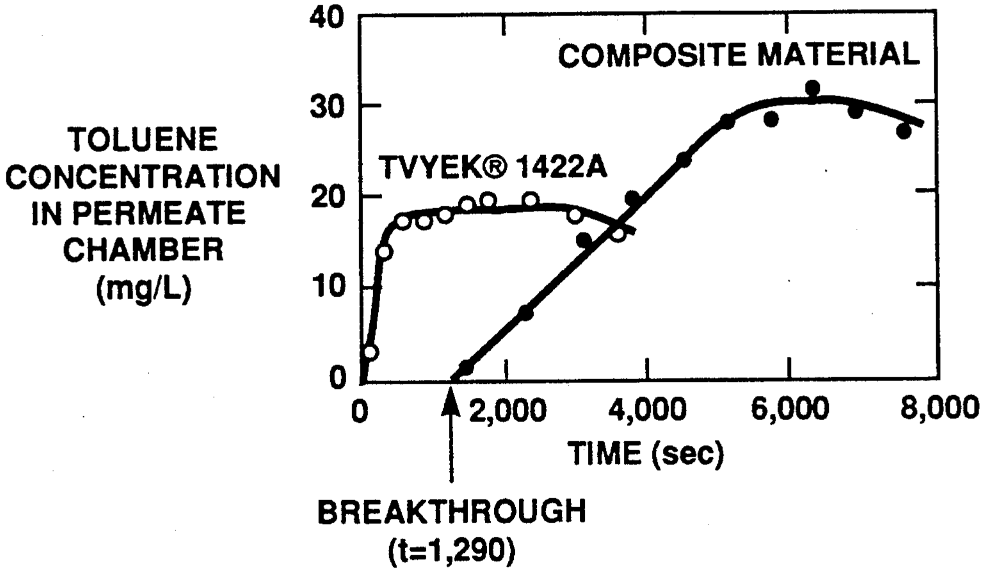
FIG. 6 is a graph of permeate toluene concentration against time measured with a protective clothing material sample exposed to an air sample saturated with toluene vapor.

Test cell experiments, using the material and ASTM general procedure of Example 12, were carried out. In this case, the increase in concentration of the vapor in the chamber over time was measured for a challenge sample of toluene vapor. The experiment was repeated with Tyvek 1422A. The results are compared in FIG. 6. As can be seen, toluene could be detected on the permeate side almost immediately with the Tyvek sample and the toluene concentration rose rapidly to about 18 mg/L. With the protective clothing material sample, no toluene was detected on the permeate side of the cell until over 20 minutes of continuous exposure. The toluene concentration on the permeate side did not reach the same level as for the Tyvek sample until over an hour of continuous exposure.

EXAMPLE 14

Comparison of Material Weights

A protective clothing material was prepared as in Example 8. Samples of the material were cut and weighed. The weight of the material was compared with weights for representative protective clothing materials obtained from the supplier or from a literature search. The results are summarized in Table 10.

TABLE 10

Comparative Weights of Protective Clothing Materials

| Material | Weight (g/cm$^2$) |
|---|---|
| Butyl rubber (Fyrepel Products, Inc.) | 428 |
| Teflon-Nomex (Chemical Fabrics Corp.) | 528 |
| PVC-Polyester (Standard Safety Equip.) | 898 |
| U.S. Army prototypes (ASTM publication #1037) | 470–815 |
| U.S. Pat. No. 4,433,024 | 145–400 |
| U.S. Pat. No. 4,513,047 | 166–400 (5–15 oz/yd$^2$) |
| U.S. Pat. No. 4,217,386 | 200 (6.2 oz/yd$^2$) |
| Example 8 (with sorbent layer) | 250 |

EXAMPLE 15

Comparison of Suit Weights

Protective clothing materials were prepared as in Example 8. The materials were used to make prototype one-piece suits comparable in shape and size with a standard Tyvek coverall. The weights of the suits were compared with other suits as shown in Table 11.

TABLE 11

Comparative Weight of Protective Clothing Suits

| Suit Material | Weight (g) |
|---|---|
| Tyvek ® | 110 |
| Saran ®-coated Tyvek ® | 296 |
| Example 8 (without sorbent layer) | 330 |
| Example 8 (with sorbent layer) | 580 |

We claim:

1. A protective material, comprising a laminate of:
   a fabric layer having a skin proximal side and a skin distal side;
   a sorbent layer, comprising a mixture of a sorbent material in a polymeric binder material; and
   a thin-film composite membrane layer, comprising a microporous support membrane coated with an ultrathin permselective membrane.

2. The material of claim 1, wherein said sorbent layer is coated on said skin proximal side and said thin-film composite membrane layer is coated on said skin distal side.

3. The material of claim 1, wherein said thin-film composite membrane layer is coated on said skin proximal side and wherein said sorbent layer is coated on said thin-film composite membrane layer.

4. The material of claim 1, wherein said sorbent layer is coated on said skin distal side and wherein said sorbent layer is also said microporous support membrane and wherein said ultrathin permselective membrane is coated on said sorbent layer.

5. The material of claim 1, further comprising an overcoat sealing layer coating one surface of said ultrathin permselective membrane.

6. The material of claim 5, wherein the sealing layer is silicone rubber.

7. The material of claim 5, wherein the thickness of the sealing layer is less than 5 microns.

8. The material of claim 1, wherein the fabric layer is made from nylon.

9. The material of claim 1, wherein the microporous support membrane is made from a polymer selected from the group consisting of polysulfones, polyamides, polyimides, polyetherether ketones and polyvinylidine fluoride.

10. The material of claim 1, wherein the permselective membrane is made from a crosslinked polymer.

11. The material of claim 1, wherein the permselective membrane is made from a polymer selected from the group consisting of cellulose derivatives, acrylates, acrylonitriles, polyamides and polyurethanes.

12. The material of claim 1, wherein the permselective membrane is made from cellulose tricaetate.

13. The material of claim 1, wherein the thickness of the permselective membrane is less than 5 microns.

14. The material of claim 1, wherein the material has a water vapor transmission rate of at least 50 g/m$^2$.h.

15. The material of claim 1, wherein the material can maintain an organic vapor concentration on the skin proximal side less than the EEL for one hour of said vapor, against a challenge concentration of said vapor on the skin distal side of 500 ppm or more.

16. The material of claim 15, wherein the organic vapor is nitrogen dioxide.

17. The material of claim 15, wherein the organic vapor is hydrazine.

18. The material of claim 1, wherein the permselective membrane is prepared by a solution coating method.

19. The material of claim 1, wherein the permselective membrane is prepared by an interfacial polymerization method.

20. A method of rendering a fabric impermeable to organic agents, comprising:

coating the fabric with a sorbent layer, comprising a mixture of a sorbent material in a polymeric binder material; and coating the fabric with a thin-film composite membrane, comprising a microporous support membrane and an ultrathin permselective membrane.

21. The method of claim 20, further comprising a step in which an overcoat sealing layer is coated in contact with at least one surface of said permselective membrane.

22. The method of claim 20, wherein said coating steps result in a protective material having a water vapor transmission rate of at least 50 $g/m^2.h$.

23. The method of claim 20, wherein said coating steps result in a protective material that can maintain an organic vapor concentration on the skin proximal side less than the EEL for one hour of said vapor, against a challenge concentration of said vapor on the skin distal side of 500 ppm or more.

24. The method of claim 23, wherein said organic vapor is hydrazine.

25. A method of protecting a person from toxic organic agents, comprising clothing said person in at least one garment fabricated from a protective material comprising:

a fabric layer, coated with;

a sorbent layer, comprising a mixture of a sorbent material in a polymeric binder material; and further coated with;

a thin-film composite membrane layer, comprising a microporous support membrane coated with an ultrathin permselective membrane.

* * * * *